J. R. BECKWITH.
MACHINE FOR SEPARATING FIBROUS PLANTS.

No. 51,413. Patented Dec. 12, 1865.

Witnesses:

Inventor:
J. R. Beckwith

UNITED STATES PATENT OFFICE.

JAMES R. BECKWITH, OF NEW ORLEANS, LOUISIANA.

IMPROVEMENT IN MACHINES FOR SEPARATING FIBROUS PLANTS FROM PULPY MATTER.

Specification forming part of Letters Patent No. 51,413, dated December 12, 1865.

*To all whom it may concern:*

Be it known that I, JAMES R. BECKWITH, of New Orleans, in the parish of Orleans and State of Louisiana, have invented a new and Improved Machine for Separating Fibers from Plants; and I do hereby declare that the following is a full, clear, and exact description thereof, which will enable others skilled in the art to make and use the same, reference being had to the accompanying drawings, forming part of this specification, in which—

Figure 1:
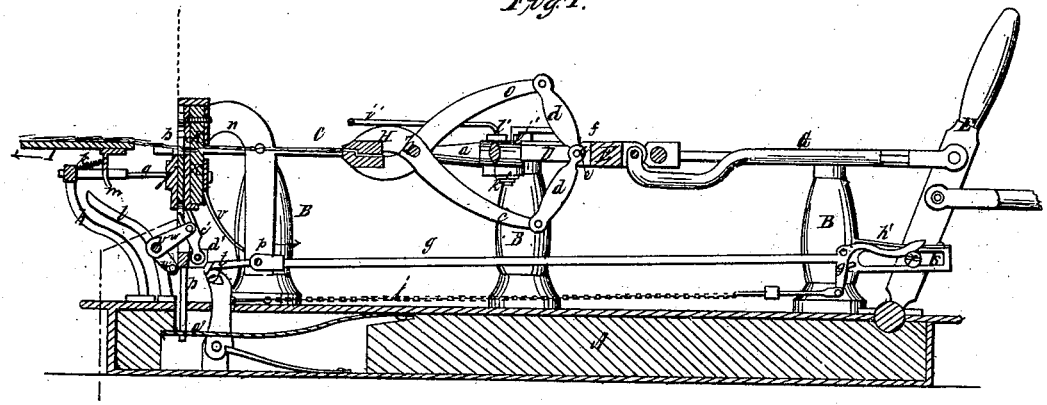
Figure 2:
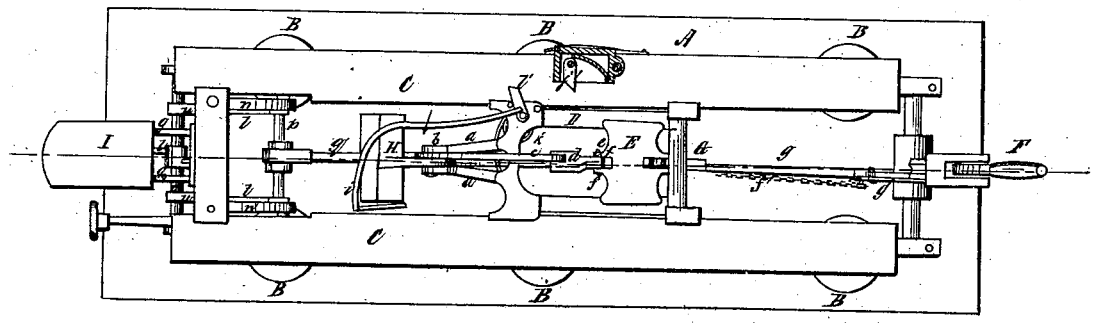
Figure 3:
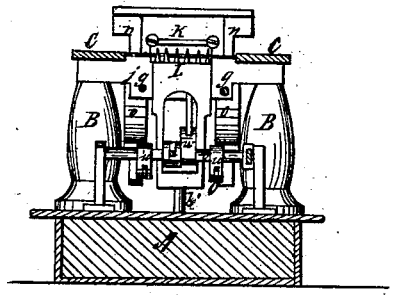

Figure 1 represents a longitudinal vertical section of this invention, the line $x\ x$, Fig. 2, indicating the plan of section. Fig. 2 is a plan or top view of the same. Fig. 3 is a front elevation of the same, partly in section.

Similar letters of reference indicate like parts.

This invention relates to a machine which is particularly intended to treat the leaves of *Agave Americana*, sisal, hemp, or other similar plants or parts of plants, in which the fibers are covered with a pulpy substance, but which can also be used for separating fibers from other plants.

Said leaves or plants, after having been crushed by the action of a pair of rollers, or without this previous crushing, are placed on a reciprocating table, by which they are carried through between a pair of stripping-jaws and delivered to reciprocating nippers, which, after taking hold of the leaf or plant, draw the same through between the stripping-jaws, causing the pulpy parts to separate from the fibers. The mechanism by which this purpose is effected is automatic, and the effect of the stripping-jaws is increased by the addition of teeth, which are secured in a rising and falling head, and which pierce the leaf or plant after the same has been delivered to the reciprocating nippers.

A represents a bed plate or frame, which supports all the working parts of my machine. From said bed-plate rise a series of columns, B, which support the guides C, between which the carriage D moves. This carriage is open, and its sides form guides for the cross-head E, to which a reciprocating motion is imparted by a rocking arm or lever, F, which connects with said cross-head by a rod, G, or by any other suitable means.

From the front end of the carriage D extend two arms, $a$, which form the bearings for the fulcrum-pin $b$ of the nippers H. The shank $c$ of the two jaws of said nippers extend back of the fulcrum-pin $b$, and they connect by links $d$ with a pin, $e$, which is screwed in lugs $f$, projecting from the front edge of the cross-head E. As the cross-head moves back and forth within the carriage D the jaws of the nippers open and close, and when the cross-head strikes the end of the carriage said carriage, together with the nippers, is compelled to move in the same direction in which the cross-head moves.

When the lever F moves in the direction of the arrow marked near it in Fig. 1 the nippers are thrown open, ready to receive the end of the leaf or plant, which is fed to them over the reciprocating table I. This table is supported by horizontal rods $g$, which are secured at one end in a cross-shaped curved standard, $h$, and at their opposite ends in a cross-bar, $j$, which is firmly secured between the guides C, near their front ends. A spring, $k$, of india-rubber or any other suitable material, has a tendency to draw said table back in the direction of the arrow marked on it in Fig. 1, and a tappet, $l$, which acts on a projection or cam, $m$, on the under surface of said table, pushes the same up against the stripping-jaws K at suitable intervals.

The lower or stationary stripping-jaw is formed by the upper surface of the cross-bar $j$; but the movable jaw is provided with two curved arms, $n$, which are pivoted to the inner edges of the guides C and subjected to the action of flat springs $o$, which have a tendency to throw said curved arms in the direction of the arrow marked near them in Fig. 1, and to close the stripping-jaws.

The lower ends of the arms $n$ are connected by a cross-bar, $p$, and a rod, $q$, extending from this bar to the oscillating lever F, serves to open the movable stripping-jaw by the action of said lever.

The connection between the lever F and the rod $q$ is effected by a stud, $r$, which is secured in the side of the lever, and projects through a slot, $s$, in the end of the rod, as shown in Fig. 1. This slot is of such length that the lever F has to be moved through a large arc before its motion is communicated to the rod $q$ and to the movable stripping-jaw.

From the cross-bar $p$ in the lower ends of the stripping-arms extend two rods, $t$, connecting the same to arms $n$, which are securely fastened to a rock-shaft, $v$, from which the tappet $l$ extends, that serves to impart motion to the table I. An arm, $w$, which is mounted on the rock-shaft $v$, serves to impart a downward motion to the stripping-teeth L. These teeth are secured to a head which slides up and down in a suitable box or guide-slot on the front edge of the cross-bar $j$, and which is subjected to the action of a spring, $a'$ secured to the under surface of the bed-plate A, which forms the guide for a shank, $b'$, extending down from the head of the stripping-teeth. The spring $a'$ has a tendency to force the teeth L up, and said teeth are depressed against the action of the spring by the arm $w$, as previously stated. This arm connects by a link, $c'$, with a lug, $d'$, at the lower part of the head of the stripping-teeth; and when the teeth are depressed by the action of the arm $w$, a spring-dog, $e'$, catches over a nose formed by the edge of the lug $d'$ and retains the same in such a position that they do not interfere with the operation of introducing the leaf or plant. After the plant has been passed through between the stripping-jaws the latter close up and the teeth are released from the spring-dog, causing them to spring up suddenly and to pierce the leaf or plant held between the stripping-jaws.

The dog $e'$ is drawn back by a chain, $f'$, which connects it to an elbow-lever, $g'$ $h'$, that is pivoted to the rod $r$, which connects the lever F with the cross-bar of the movable stripping-jaw. The arm $h'$ of said elbow-lever is curved, and placed in such a position that the stud $r$ of the lever F produces a rising and falling action on the same whenever said hand-lever is moved from its most advanced position in a direction opposite to the arrow marked near said lever in Fig. 1. By this action of the stud on the elbow-lever the chain $f'$ is stretched, and the spring-dog $e'$ is drawn back, causing it to release the stripping-teeth, as previously stated.

The leaf or plant, after having been stripped, is thrown out of the nippers H by a curved arm, $i'$, which is secured to the carriage D, and to which a transversely-sweeping motion is imparted by the action of a spring-dog, $j'$, that is pivoted to the upper surface of one of the guides C, as shown in Figs. 1 and 2 of the drawings.

The connection between the arm $i'$ and the carriage is effected by a vertical arbor which extends through said carriage and is subjected to the action of a coiled spring, $k'$, having a tendency to turn the arm $i'$ in the direction of the arrow (marked near it in Fig. 2.) From the vertical arbor extends a tappet, $l'$, and if the lever F is moved in the direction opposite the arrow marked near it in Fig. 1 the tappet $l'$ forces the spring-dog $j'$ back without producing any action of the arm $i'$; but when the hand-lever is moved in the direction of said arrow the spring-dog, being rendered rigid by the case surrounding it, causes the curved arm to sweep in the direction opposite the arrow marked near it in Fig. 2, and the leaf or plant contained between the nippers is thrown out.

The motions of the different parts of this machine in relation to each other are timed as follows: In pushing the lever F forward in the direction of the arrow marked near it in Fig. 1 the nippers are first opened and then the stripping-jaws are opened, while at the same time the teeth L descend and are hooked by the spring-dog $e'$. The table begins to move toward the stripping-jaws, and a leaf or plant, which has been adjusted thereon with its butt-end toward the stripping-jaws, is carried through said jaws and its end presented to the nippers. The hand-lever is then moved back, the nippers close up and take a firm hold of the leaf or plant, drawing the same through between the stripping-jaws, which close up immediately after the nippers. As soon as the stripping-jaws have closed up the teeth, being released by the spring-dog $e'$, fly up and pierce the leaf or plant, so that they assist the jaws in removing the pulpy part from the fibers. The stripping-jaws may be lined with india-rubber cloth or other suitable material, in order to increase their effect on the pulpy parts of the leaves or plants. When the leaf has been drawn clear through the stripping-jaws the hand-lever is moved forward again, and by the action of the dog $j'$ the arm $i'$ is caused to throw out the leaf held between the nippers, thus clearing them ready for the subsequent operation, the machine being operated by hand or any suitable motive power.

Having thus described my invention, I claim as new and desire to secure by Letters Patent—

1. The use of self-acting nippers, in combination with suitable stripping-jaws, constructed and operating substantially as and for the purpose described.

2. The combination of the self-acting stripping-teeth with the stripping-jaws, substantially as and for the purpose set forth.

3. The reciprocating table, in combination with the stripping-jaws and nippers, constructed and operating substantially as and for the purpose specified.

4. The self-acting curved clearing-arm, in combination with the nippers, constructed and operating substantially as and for the purpose set forth.

5. The application of a self-acting spring-dog, in combination with the stripping-teeth, constructed and operating substantially as and for the purpose described.

6. The use of a curved elbow-lever, $g'$ $h'$, in combination with the stud $r$, lever F, chain $f'$, and spring-dog $e'$, constructed and operating substantially as and for the purpose specified.

JAMES R. BECKWITH.

Witnesses:
SAM. H. TORREY,
H. A. TORREY.